(12) United States Patent
Kapoor et al.

(10) Patent No.: US 7,546,559 B2
(45) Date of Patent: Jun. 9, 2009

(54) METHOD OF OPTIMIZATION OF CLOCK GATING IN INTEGRATED CIRCUIT DESIGNS

(75) Inventors: Bhanu Kapoor, Richardson, TX (US); Debabrata Bagchi, Bangalore (IN); Nitin Sharma, Ghaziabad (IN)

(73) Assignee: Atrenta, Inc., San Jose, CA (US)

( * ) Notice: Subject to any disclaimer, the term of this patent is extended or adjusted under 35 U.S.C. 154(b) by 387 days.

(21) Appl. No.: 11/419,624

(22) Filed: May 22, 2006

(65) Prior Publication Data

US 2006/0248487 A1    Nov. 2, 2006

Related U.S. Application Data

(63) Continuation-in-part of application No. 10/631,755, filed on Aug. 1, 2003, now Pat. No. 7,076,748.

(51) Int. Cl.
*G06F 17/50* (2006.01)
*G06F 9/455* (2006.01)

(52) U.S. Cl. .................. 716/2; 716/1; 716/6; 716/7; 716/8; 716/11; 703/14; 703/19

(58) Field of Classification Search ............ 716/1, 716/2, 6, 7, 8, 11; 703/14, 19
See application file for complete search history.

(56) References Cited

U.S. PATENT DOCUMENTS

| | | | |
|---|---|---|---|
| 5,585,745 A | 12/1996 | Simmons | |
| 5,623,418 A | 4/1997 | Rostoker | |
| 5,740,087 A | 4/1998 | Smentek | |
| 5,980,092 A | 11/1999 | Merryman | |
| 6,049,883 A | 4/2000 | Tjandrasuwita | |
| 6,167,561 A | 12/2000 | Chen | |

(Continued)

OTHER PUBLICATIONS

Raghavan et al.; "Automatic insertion of gated clocks at register transfer level"; Jan. 7-10, 1999; VLSI Design; Proceedings. Twelfth International Conference On; pp. 48-54.*

(Continued)

*Primary Examiner*—Helen Rossoshek
(74) *Attorney, Agent, or Firm*—Sughrue Mion, PLLC (57) ABSTRACT

A method for optimization of clock gating in integrated circuit (IC) design. Clock gating techniques are very useful in reducing the electrical power consumed by an IC. A general method for identifying registers that are candidates for clock gating is presented. Furthermore, a determination is made regarding which of the candidate registers to clock gate in order to achieve optimal power and IC area savings. The determination is based on switching activity of the candidate registers.

33 Claims, 6 Drawing Sheets

U.S. PATENT DOCUMENTS

| | | |
|---|---|---|
| 6,204,695 B1 | 3/2001 | Alfke |
| 6,240,542 B1 | 5/2001 | Kapur |
| 6,272,667 B1 | 8/2001 | Minami |
| 6,324,679 B1 | 11/2001 | Raghunathan |
| 6,429,698 B1 | 8/2002 | Young |
| 6,434,704 B1 | 8/2002 | Dean |
| 6,567,962 B2 | 5/2003 | Baumgartner |
| 7,062,725 B2 * | 6/2006 | Kitahara et al. ................. 716/1 |
| 7,080,334 B2 * | 7/2006 | Fan et al. ....................... 716/6 |
| 2003/0140318 A1 | 7/2003 | Kitahara |
| 2004/0123258 A1 | 6/2004 | Butts |
| 2004/0225978 A1 | 11/2004 | Fan |
| 2004/0250227 A1 | 12/2004 | Lin |

OTHER PUBLICATIONS

Davis; "Logical Design Using Shift Registers"; Oct. 1969; Computers, IEEE Transactions on; vol. C-18, Issue 10, pp. 958-960.*

* cited by examiner

METHOD OF OPTIMIZATION OF CLOCK GATING IN INTEGRATED CIRCUIT DESIGNS

CROSS-REFERENCE TO RELATED APPLICATIONS

This application is a continuation-in-part of U.S. patent application Ser. No. 10/631,755 filed on Aug. 1, 2003, the content of which is incorporated herein by reference in its entirety.

TECHNICAL FIELD

The present invention relates generally to the design of ICs using a gated clock design technique, and more particularly to the low power IC design.

BACKGROUND OF THE INVENTION

In recent years, the size of integrated circuits (ICs) has dramatically increased in both size and number of transistors, resulting in higher power consumption. In typical IC designs, the clock distribution network, i.e., the clock tree, can consume from twenty to fifty percent of an IC's total active power. One important technique for reducing power consumption in IC designs is to reduce the power of an IC's clock distribution tree by gating portions of the IC that do not need to be clocked under certain conditions.

This process, known as "clock gating", disables the clocks fed to logic blocks of the IC when the logic blocks are not currently enabled or otherwise in active use. Power consumption due to the clocking of logic blocks that are not directly involved with the current operation of the IC is thereby minimized.

Figure 1:
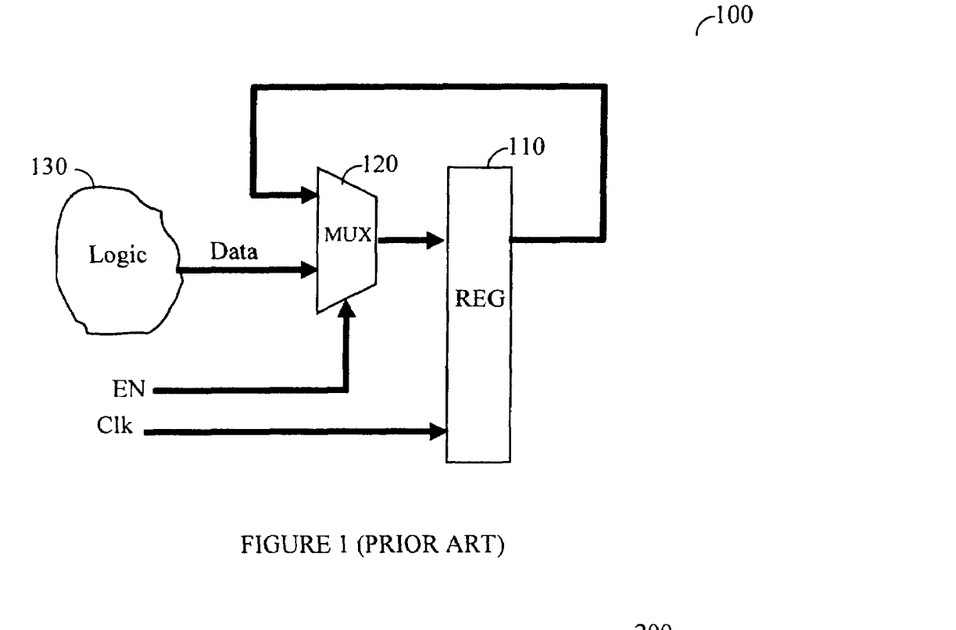
FIG. 1 is a partial logic circuit which has not been clock gated (prior art).

Reference is now made to FIG. 1 that shows a partial logic circuit 100 that has not been clock gated. Circuit 100 includes a synchronous load-enable register 110 and a multiplexer (MUX) 120 implementing the load enabling. The clock input port provides the clock signal "CLK" which clocks register 110 every cycle. The enable port provides an enable signal "EN" that enables MUX 120, thereby allows data propagation from logic 130 to register 110. Obviously, there is no need to clock register 110 on every cycle, since the data at the input of register 110 does not change every clock cycle.

Figure 2:
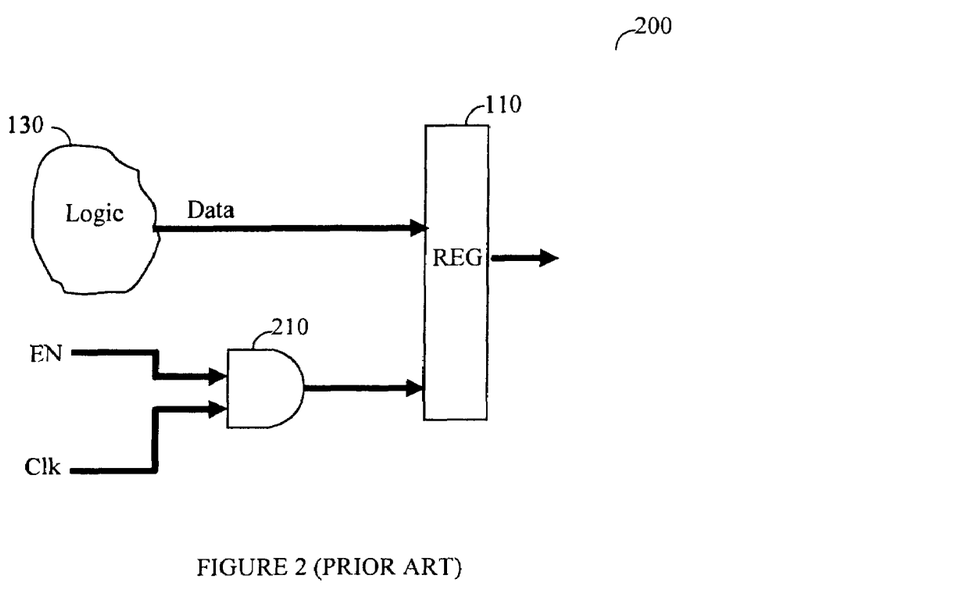
FIG. 2 is a partial logic circuit to which the clock gating technique is applied.

Reference is now made to FIG. 2 that shows a partial logic circuit 200 to which a clock gating technique is applied. In circuit 200, an AND gate 210 is used as the gating circuit. The clock and the enable ports are connected to AND gate 210 as its inputs. When the enable signal is set to a logic value '1', data is input to register 110 synchronously with the clock signal "CLK". On the other hand, when the enable signal is set to a logic value '0', data is not input to register 110 irrespective of the clock signal. Accordingly, when there is no need for loading data to register 110, unnecessary power consumption can be avoided by outputting the enable signals of a logic zero synchronously with the clock signal. The AND gate 210 controls the load enable signal of register 110 thus MUX 120 is eliminated from the circuit.

The clock gating technique is well known in the art as an effective technique for reducing the dynamic power of a system. In fact, the amount of dynamic power reduction depends on the number of registers that are gated and the percentage of time that the gated clock (i.e., the output of AND gate 210) is enabled. However, gating all registers in the design increases the size of the IC. As a result, traditional approaches gate all the registers having size greater than a predefined threshold. Alternatively, registers to be clock gated are manually selected. These approaches are not optimal, in terms of power and area cost, as most of the savings can be achieved using only few clock gating structures.

It would be therefore advantageous to provide a more efficient approach for selecting registers that are candidates for clock gating implementation.

DETAILED DESCRIPTION OF THE INVENTION

A method for optimization of clock gating in integrated circuit (IC) design. Clock gating techniques are very useful in reducing the electrical power consumed by an IC. The present invention provides a general method for identifying registers that are candidates for clock gating. Furthermore, the invention determines which of the candidate registers to clock gate in order to achieve optimal power and IC area savings. The determination is based on switching activity of the candidate registers.

Figure 3:
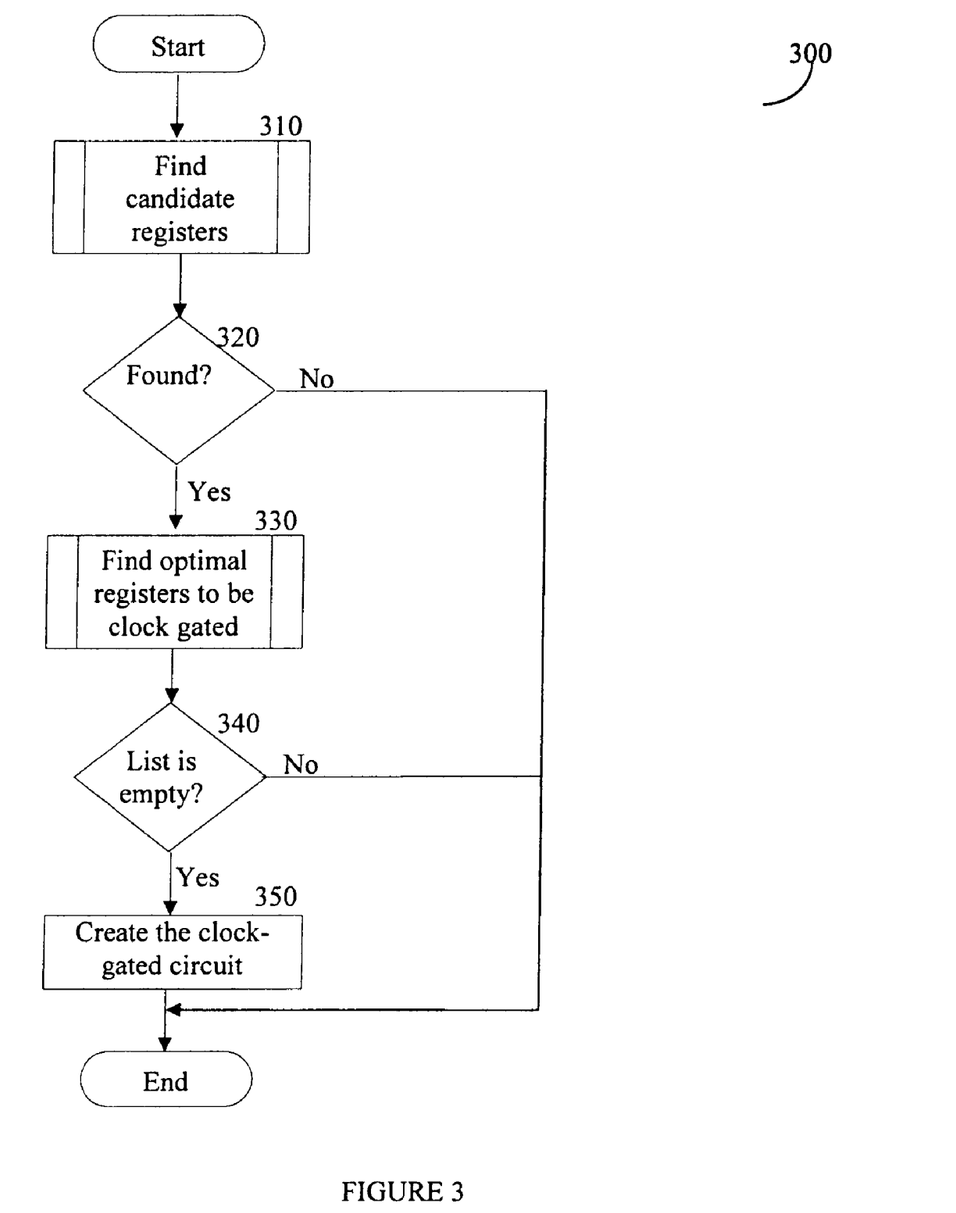
FIG. 3 is a flowchart describing the method for clock gating registers in the design of ICs according to one exemplary embodiment of the invention.

Reference is now made to FIG. 3 which shows a flowchart 300 describing the method, according to one exemplary embodiment of the invention, for clock gating registers in the design of ICs. Although the examples presented herein include only a limited number of gates, this is merely for the purpose of simple explanations of the various exemplary embodiments of the invention. The examples should not be viewed as limiting the scope of the disclosed invention and it is specifically noted that the methods disclosed herein are operative with respect to designs of ICs that include a large number of logic gates and a large number of time domains.

Figure 4:
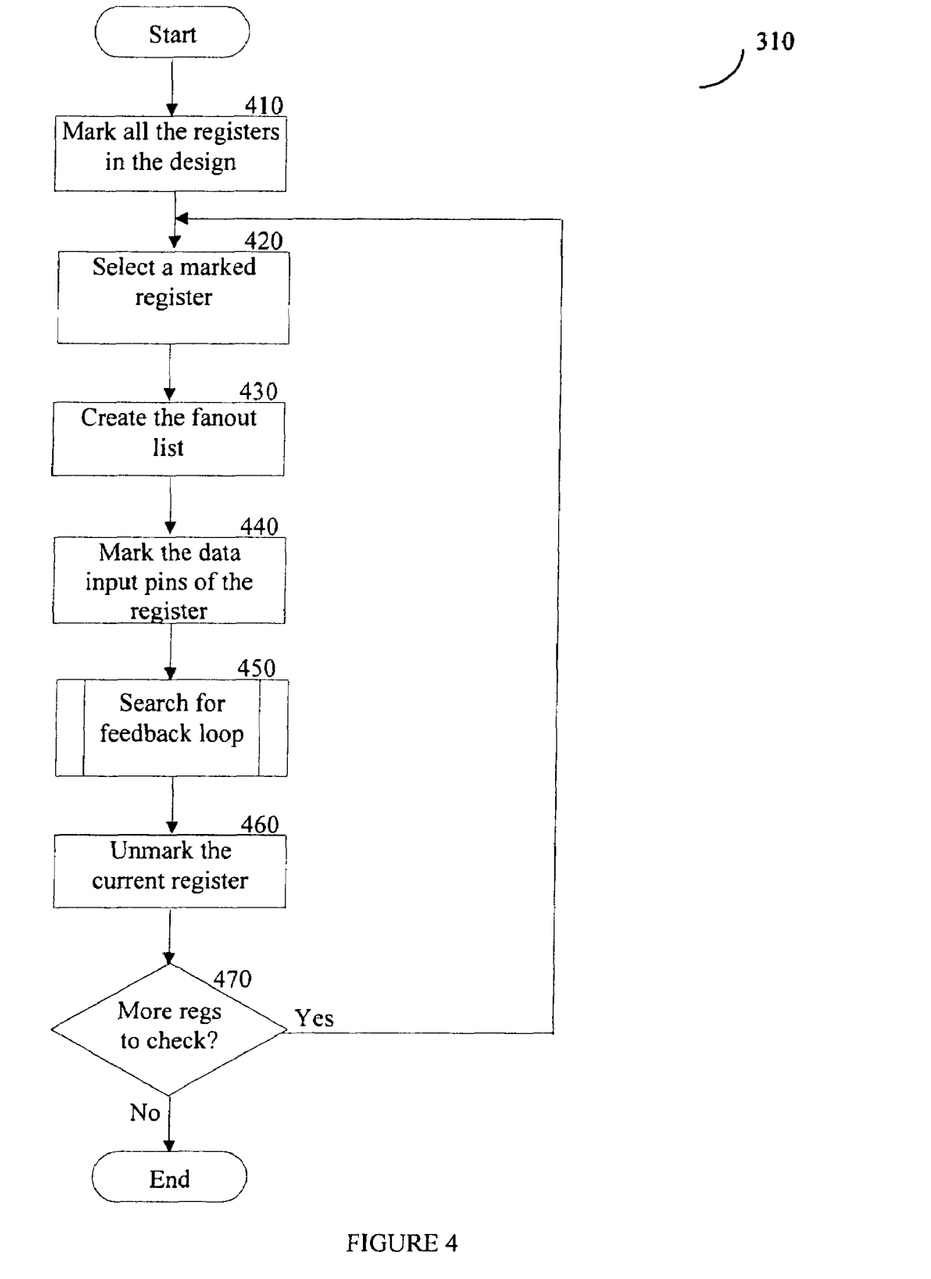
FIG. 4 is a flowchart describing the method for identifying registers that are candidates for clock gating.

At step 310, registers with a feedback loop as well as other registers that are likely candidates for clock gating, encountered in a given design, are identified. All the registers that are candidates for clock gating are saved in a temporary list (also referred to as the "candidates list"). Referring to FIG. 4, a detailed description of one implementation of step 310 is provided. According to an exemplary embodiment of the invention, the candidate registers are detected using a synthesized netlist produced by an IC synthesis tool. Synthesis tools produce gate level netlists based on the register transfer level (RTL) statements.

Netlists generally include logical gates such as AND, NAND, NOR, OR, XOR, NXOR, and the likes. One such synthesis tool is described in the co-pending US patent application entitled, "An Apparatus and Method for Handling of Multi-Level Circuit Design Data", Ser. No. 10/118,242, assigned to common assignee and hereby incorporated by reference in its entirety. At step 410, all the registers in the design are marked as candidates for clock gating. At step 420, a single marked register is selected. At step 430, there is created a list of nets connected to the register fanout (hereinafter "fanout list") of the currently marked register. The fanout is the output terminal on a register or the net attached to an output terminal.

At step 440, all the input data pins of the selected register are marked. At step 450, for each net in the fanout list, the method identifies a feedback loop connected between the net and the data input pins. The feedback loop should exclude combinational logic elements. At step 460 the currently examined register is unmarked and at step 470, a check is performed to determine if there are more marked candidate registers to examine and, if there are, execution continues with step 420; otherwise, execution is terminated.

In another exemplary embodiment of the invention, method 400 further identifies registers without a feedback loop as candidates for clock gating. Such registers may be registers with common enable signals and clock inputs present across various units in the IC design. In addition, registers with fanout of higher than a prespecified threshold are also identified as possible candidates for clock gating, since such registers tend to impact large portions of the design. The threshold in this case is a user specified parameter. Furthermore, logic blocks that include registers and multiplexers connected with a feedback loop are also identified as clock gated.

Another exemplary embodiment of the invention uses some heuristics in method 400 to eliminate certain feedback paths identified as candidates for clock gating. For example, if the feedback path contains only an inverter, then it is considered to be a derived clock and eliminated as a candidate for clock gating. As another example, if the feedback path contains an incrementor (i.e., a basic binary adder), decrementor, or any arithmetic operations with one of the operands as constants, then it is eliminated as a candidate for clock gating.

Referring back to FIG. 3, where, at step 320, it is determined whether the candidates list is empty. If the list is empty, then execution ends. Otherwise, the execution continues with step 330. At step 330, from the candidate registers the optimal registers to be clock gated are determined. The determination is based on the activity of a clock signal, probability of an enable signal, and the size of each candidate register. The result of step 330 is a list of registers to be gated (also referred to as the "gating list"). A more detailed description of one implementation of step 330 is provided below with reference to FIG. 7. At step 340 another check is made to determine if the gating list is empty, and of so execution terminates; otherwise execution continues with 350. At step 350 the clock gated circuits are generated by gating the registers in the gating list.

Figure 5:
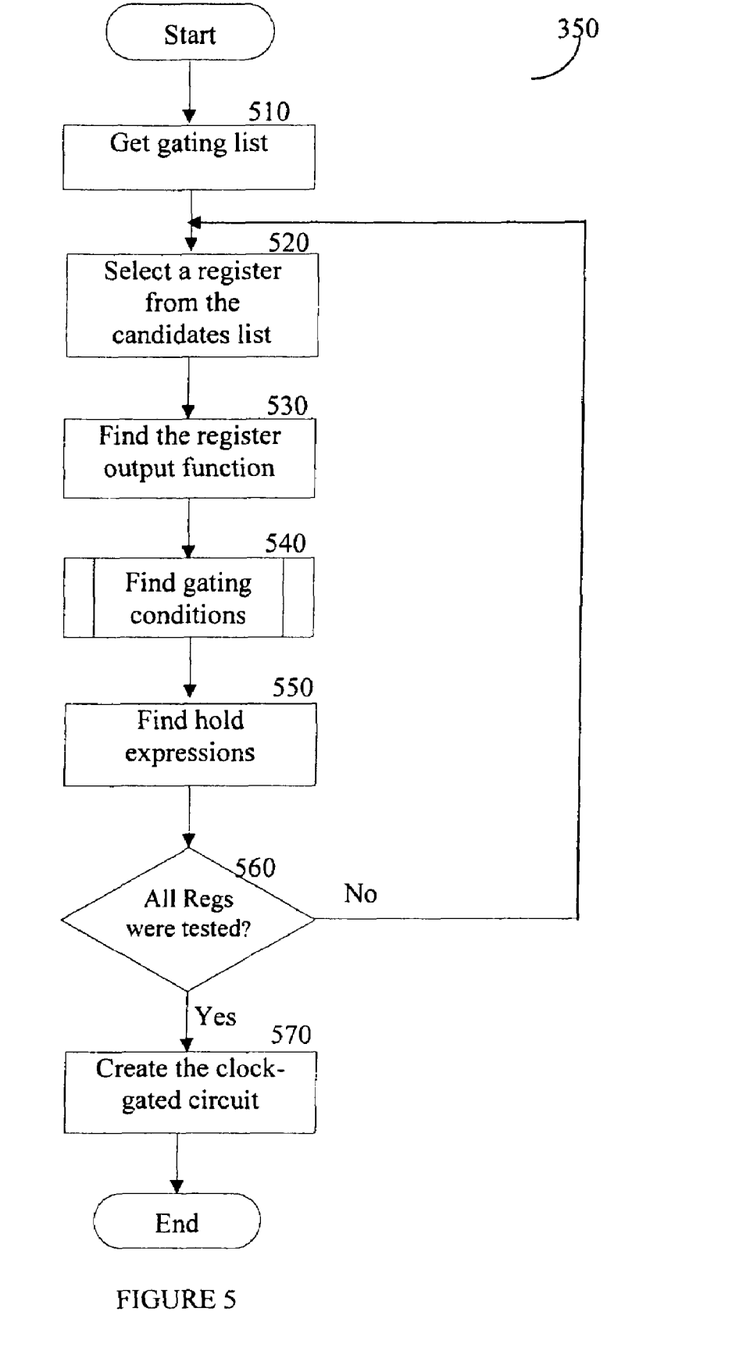
FIG. 5 is a flowchart describing the process for generating clock gated circuits

Reference is now made to FIG. 5 where the execution of step 350 is shown greater detail. At step 510 the gating list is received and, at step 520, a single register from the list is selected. At 530, the logical condition that results in data being held by the selected register, i.e., the logical condition that defines the output function of the selected register is determined. At step 540, the gating conditions for the selected register are determined. This is performed by identifying control signals that create a simple feedback loop without any combinational logic components in the path, except for gates whose functions become equivalent to simple buffers.

At step 550, the hold expressions are determined. Hold expressions are the remaining logical expressions being fed into the data input of the selected register, after the register output function has been evaluated with respect to the clock gating conditions. At step 560, a check is performed to determine if all the registers in the gating list were examined. If so, execution continues at step 570; otherwise, execution continues at step 520. At step 570, the clock gated circuits are formed by gating the registers. The gating circuits are generated using the output functions, gating conditions, and hold expressions. In any design, gating the registers results in the formation of a number of gated clock domains.

Figure 6:
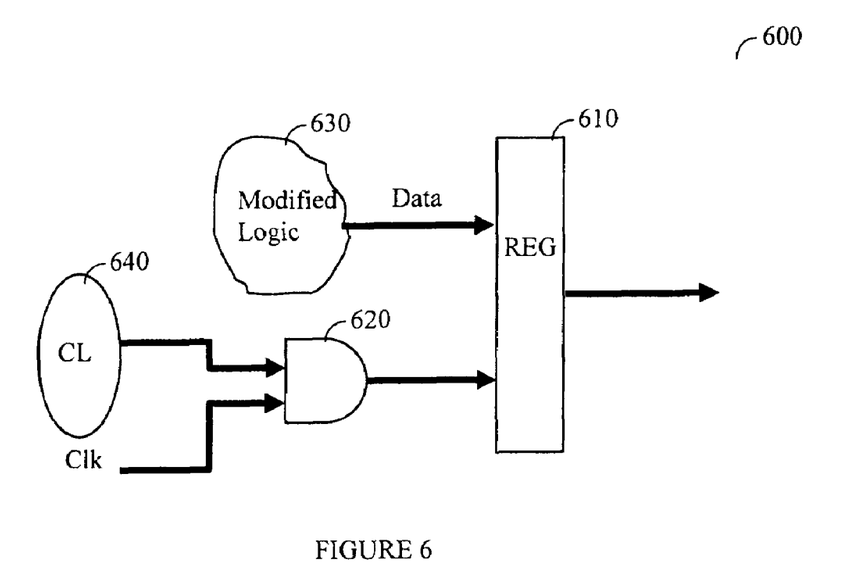
FIG. 6 is a resultant logic circuit which is clock gated in accordance with the disclosed invention

FIG. 6 shows an exemplary circuit 600 that was gated using the techniques described herein. Specifically, the combinatorial logic (CL) 640 is generated using the computed output functions, gating conditions, and hold expressions and inserted to the design. The CL 640 is connected to an AND gate 620 which is also added to circuit 600.

Figure 7:
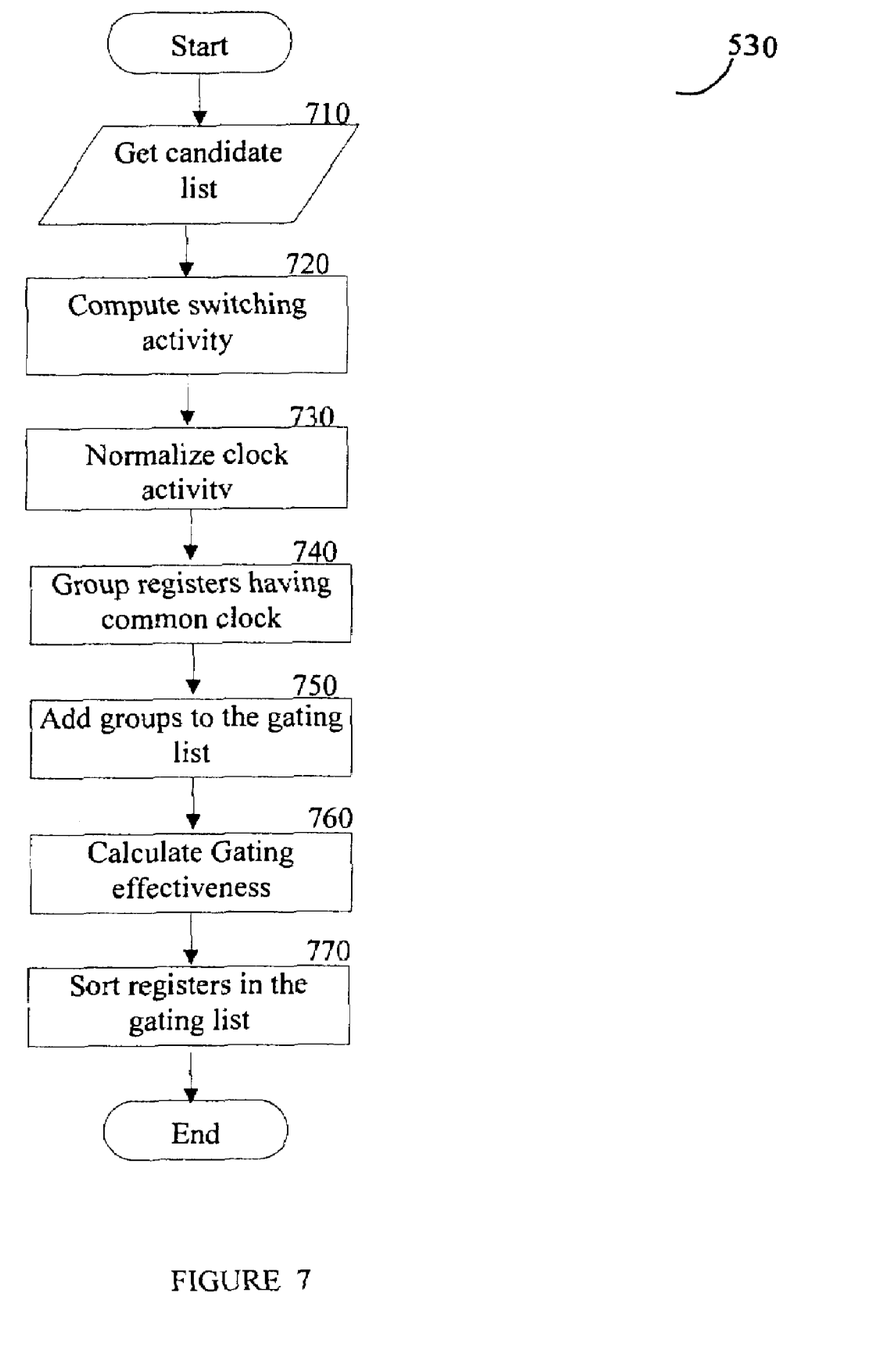
FIG. 7 is a flowchart describing the method for determining the optimal registers to be clock gated in accordance with an exemplary embodiment of the present invention

FIG. 7 shows an exemplary and non-limiting flowchart 530 describing the method for determining the optimal registers to be clock gated in accordance with an exemplary embodiment of the present invention. The clock gating candidates are selected based on the switching activity information to ensure optimal power and area saving. Specifically, the switching activity information includes the activity of the clock signal, the probability of the enable signal, and the size of the candidate register. The clock activity and its frequency have a direct relationship with the power consumed by the registers. The probability of the enable signal identifies registers that are always enabled, and thus gating such registers is ineffective. The size of the candidate register determines how many registers can be connected to the same clock gating structure.

At step 710 the candidate list is received. At step 720, for each register in the candidate list, the switching activity of the register is computed. The activity can be computed using statistical algorithms, simulation-based algorithms, or a combination thereof. The switching activity of combinatorial and sequential elements is estimated based on the activity of the inputs of the element. That is, given input switching rates, the probability of each gate switching at any particular time point is computed. These probabilities are then summed up over all the gates to obtain the expected switching activity in the entire circuit over all the time points corresponding to a clock cycle. Algorithms for computing the switching activity of combinatorial elements (e.g., AND gates, NAND gates, NOR gates, OR gates, XOR gates, NOT gates, and the like) are well known in the art. The switching activity of sequential elements is computed using various models. For example, the probability of an output Q of a simple flip-flop can be computed using the equation:

$$p\_Q = (p\_Q\_old * (100 - (t\_CP/2)) + (p\_D * (t\_CP/2)))/100;$$

where, p_Q_old is a predefined value (e.g., 50) t_CP is the activity of the clock signal and p_D is the input probability. P_Q_old is assumed to be 50, since it is equiprobable that the flop could have contained either '0' or '1' before the state change. Equal weights are given to the previous state of the flop and the new state of the flop.

The activity of the output Q (t_Q) is computed as follows:

if $(t\_CP <= t\_D)$ $$t\_Q = t\_CP;$$

else $$t\_Q = (p\_E * t\_D)/100;$$

where, t_D is the activity of the input and p_E is the probability of the enable signal if the clock is gated. If the flip-flop is not an enabled flip-flop, p_E is set to 100. If the flip-flop is an enabled flip-flop, a state change occurs only if the enable is equal to '1'. Thus p_E, i.e., the probability of Enable being 1 is taken into consideration.

As another example, the probability (p_Q) and the activity (t_Q) of an output Q of an enabled latch are computed as follows:

$$p\_Q = p\_D;$$

$$t\_Q = ((t\_D * p\_E)/100)$$

Using the statistical algorithms, the switching activity of a design can be quickly calculated, as time-consuming simulations are not required.

In some cases the method uses simulation data for computing switching activity. Specifically, for all the nets that were simulated the switching activity can be generated based on the number of toggles from '0' to '1' and from '1' to '0' during simulation. The method can further use both statistical techniques and simulation data for generating the switching activity of the design. That is, for nets that simulation data is not available the activity is computed using the statistical algorithms.

At S730, in a design with multiple clock domains, all the activity of the clock is normalized according to the clock with the highest activity. At S740, registers having a common clock (which is not gated) and an enable signal are grouped together and added, at S750, to the gating list. At S760, the gating effectiveness of each group of registers in the gating list is calculated. The gating effectiveness is a function of the size of group (i.e., number of registers in the group), activity of the common clock (or the net driving the clock), and probability of the common enable. In one exemplary embodiment the gating effectiveness (GE) is computed using the following is equation:

$$GE = \text{Size of candidate} * \text{Activity of clock net} * \text{Probability of enable net}$$

Based on the gating effectiveness of each groups a cumulative effectiveness report may be generated. At S770, registers in the gating list may be sorted according to their gating effectiveness and registers having a gating effectiveness value below a predefined threshold are removed from the gating list. Cumulative effectiveness for a register group is equal to the GE of the group plus the cumulative effectiveness of its previous register group in the sorted list of gating effectiveness.

What is claimed is:

1. An integrated circuit (IC) design method for reducing IC power consumption and IC area by the efficient implementation of register clock gating in an IC design, comprising:
   identifying candidate registers of the IC design to be clock gated;
   from the candidate registers, determining optimal registers to be clock gated to achieve optimal power and IC area savings;
   clock gating the optimal registers: and
   storing the register clock gated IC design in a computer readable storage device wherein determining said optimal registers further comprising: computing switching activity of each candidate register; grouping registers having a common clock signal; and calculating gating effectiveness for each group of registers with a common clock signal.

2. The method of claim 1, wherein the register comprises at least one of: a logic flip-flop, a memory cell, and combinational logic loops that form a de-facto memory.

3. The method of claim 1, wherein said candidate register comprises at least one of: a register having a feedback loop, and a register with a fanout higher than a predetermined threshold.

4. The method of claim 3, wherein said feedback loop excludes combinational logic elements.

5. The method of claim 1, wherein said switching activity comprises: activity of a clock signal, a probability of an enable signal, and a size of the candidate register.

6. The method of claim 5, wherein said switching activity is computed using at least one of statistical algorithms, simulation-based algorithms, and a combination thereof.

7. The method of claim 5, wherein computing said switching activity further comprising:
   normalizing the activity of clock signals.

8. The method of claim 1, wherein said gating effectiveness is a function of: the number of registers in a group, activity of the common clock, and probability of an enable signal.

9. The method of claim 8, wherein groups of registers are sorted according to their computed gating effectiveness.

10. The method of claim 9, wherein registers having gating effectiveness value above a predefined threshold are optimal registers.

11. The method of claim 1, wherein gating said optimal register further comprises:
   determining an output function of the candidate register;
   determining one gating condition for the candidate register;
   determining at least one hold expression for the candidate register; and
   based on the result of the determining of the output function, the gating condition, and the hold expression, clock gating the candidate register.

12. A computer program product for enabling a computer system to perform operations of an integrated circuit (IC) design method, for reducing IC power consumption and IC area by the efficient implementation of register clock gating in an IC design, the computer program product comprising:
   a computer readable storage device having computer instructions for performing the operations of the IC design method, the operations comprising:
   identifying candidate registers of the IC design to be clock gated;
   from the candidate registers, determining optimal registers to be clock gated to achieve optimal power and IC area savings;
   clock gating the optimal registers; and
   storing the register clock sated IC design in a computer readable storage device wherein determining said optimal registers further comprising: computing switching activity of each candidate register; grouping registers having a common clock signal; and calculating gating effectiveness for each group of registers with a common clock signal.

13. The computer program product of claim 12, wherein the register comprises at least one of: a logic flip-flop, a memory cell, and combinational logic loops that form a de-facto memory.

14. The computer program product of claim 12, wherein said candidate register comprises at least one of: a register having a feedback loop, and a register with a fanout higher than a predetermined threshold.

15. The computer program product of claim 14, wherein said feedback loop excludes combinational logic elements.

16. The computer program product of claim 12, wherein said switching activity comprises: activity of a clock signal, a probability of an enable signal, and a size of the candidate register.

17. The computer program product of claim 16, wherein said switching activity is computed using at least one of statistical algorithms, simulation-based algorithms, and a combination thereof.

18. The computer program product of claim 16, wherein computing said switching activity further comprising:
   normalizing the activity of clock signals.

19. The computer program product of claim 12, wherein said gating effectiveness is a function of: the number of registers in a group, activity of the common clock, and probability of an enable signal.

20. The computer program product of claim 19, wherein groups of registers are sorted according to their computed gating effectiveness.

21. The computer program product of claim 20, wherein registers having gating effectiveness value above a predefined threshold are optimal registers.

22. The computer program product of claim 12, wherein gating said optimal register further comprises:
   determining an output function of the candidate register;
   determining one gating condition for the candidate register;
   determining at least one hold expression for the candidate register; and
   based on the result of the determining of the output function, the gating condition, and the hold expression, clock gating the candidate register.

23. A computer system for performing an integrated circuit (IC) design method, for reducing IC power consumption and IC area by the efficient implementation of register clock gating in an IC design, the computer system having a processor and a memory under control of the processor, the memory including software instructions for performing operations comprising:
   identifying candidate registers of the IC design to be clock gated;
   from the candidate registers, determining optimal registers to be clock gated to achieve optimal power and IC area savings; and
   clock gating the optimal registers; and
   storing the register clock gated IC design in a computer readable storage device wherein determining said optimal registers further comprising: computing switching activity of each candidate register; grouping registers having a common clock signal; and calculating gating effectiveness for each group of registers with a common clock signal.

24. The computer system of claim 23, wherein the register comprises at least one of: a logic flip-flop, a memory cell, and combinational logic loops that form a de-facto memory.

25. The computer system of claim 24, wherein said candidate register comprises at least one of: a register having a feedback loop, and a register with a fanout higher than a predetermined threshold.

26. The computer system of claim 25, wherein said feedback loop excludes combinational logic elements.

27. The computer system of claim 23, wherein said switching activity comprises: activity of a clock signal, a probability of an enable signal, and a size of the candidate register.

28. The computer system of claim 27, wherein said switching activity is computed using at least one of statistical algorithms, simulation-based algorithms, and a combination thereof.

29. The computer system of claim 27, wherein computing said switching activity further comprising:
   normalizing the activity of clock signals.

30. The computer system of claim 23, wherein said gating effectiveness is a function of: the number of registers in a group, activity of the common clock, and probability of an enable signal.

31. The computer system of claim 30, wherein groups of registers are sorted according to their computed gating effectiveness.

32. The computer system of claim 31, wherein registers having gating effectiveness value above a predefined threshold are optimal registers.

33. The computer system of claim 23, wherein gating said optimal register further comprises:
   determining an output function of the candidate register;
   determining one gating condition for the candidate register;
   determining at least one hold expression for the candidate register; and
   based on the result of the determining of the output function, the gating condition, and the hold expression, clock gating the candidate register.

* * * * *